US008290172B2

(12) United States Patent
Langella

(10) Patent No.: US 8,290,172 B2
(45) Date of Patent: Oct. 16, 2012

(54) MULTI-SOURCE DISTRIBUTED AUDIO AMPLIFICATION AND CONTROL SYSTEM FOR STRUCTURED WIRING SYSTEMS

(75) Inventor: Albert G. Langella, White Plains, NY (US)

(73) Assignee: Audio Design Associates, Inc., White Plains, NY (US)

( * ) Notice: Subject to any disclaimer, the term of this patent is extended or adjusted under 35 U.S.C. 154(b) by 1592 days.

(21) Appl. No.: 11/620,572

(22) Filed: Jan. 5, 2007

(65) Prior Publication Data

US 2008/0165983 A1    Jul. 10, 2008

(51) Int. Cl.
*H04B 3/00* (2006.01)
(52) U.S. Cl. .......... 381/77; 381/120; 381/123; 340/533; 379/413.03
(58) Field of Classification Search ............... 381/77, 381/123, 79, 80, 81, 120; 439/607.26, 607.23, 439/607.25, 620.22, 620.2, 620.23, 620.15, 439/620.21; 340/310.11–310.18, 533; 379/413.03, 379/413.02
See application file for complete search history.

(56) References Cited

U.S. PATENT DOCUMENTS

| 5,255,322 | A | 10/1993 | Farinelli et al. |
| 7,068,972 | B2 | 6/2006 | Tarr |
| 7,650,003 | B1* | 1/2010 | Hines ............................ 381/152 |
| 2003/0007309 | A1 | 1/2003 | Miller et al. |
| 2003/0035556 | A1 | 2/2003 | Curtis et al. |
| 2006/0126862 | A1 | 6/2006 | Andrews et al. |
| 2006/0191697 | A1* | 8/2006 | Cardenas et al. ............... 174/50 |
| 2007/0104338 | A1* | 5/2007 | Privett ......................... 381/120 |
| 2007/0220560 | A1* | 9/2007 | Devine, III ...................... 725/78 |

* cited by examiner

*Primary Examiner* — Vivian Chin
*Assistant Examiner* — Con P Tran
(74) *Attorney, Agent, or Firm* — Marc E. Hankin; Kevin Schraven; Hankin Patent Law, APC

(57) ABSTRACT

Various embodiments of the invention are directed toward a multi-zone audio distribution, amplification, and control system for use with structured wiring systems. Various embodiments of the invention allow audio signals received from multiple input sources to be selectively distributed to multiple zones in a home or building over a structured wiring system.

19 Claims, 3 Drawing Sheets

MULTI-SOURCE DISTRIBUTED AUDIO AMPLIFICATION AND CONTROL SYSTEM FOR STRUCTURED WIRING SYSTEMS

FIELD OF INVENTION

Various embodiments of this invention relate, generally, to audio amplification systems; more particularly, to audio amplification systems that allow multiple sources to be amplified and distributed to multiple zones at the same time over conventional structured wiring systems, without the need for customized pre-wiring or retrofitting.

BACKGROUND

Audio amplification systems generally comprise multiple components that process signals from audio sources such that they are suitable for routing to loudspeakers and the like. Preamplifiers are commonly used in the art to amplify a low level signal, to switch between various audio sources, and to apply volume control. No substantial amplification of the signal generally takes place at the preamplifier. In an audio system the second amplifier is typically a power amplifier, which provides the higher current to the signal that is required to power loudspeakers.

In the art of home audio component design, several developments have been made in order to allow a single audio component system to control the loudspeakers in multiple rooms or locations. U.S. Pat. No. 5,255,322 to Farinelli et al., for example, discloses a multi-zone audio distribution amplifier system, which may be used as modular or cascadable amplifier units. The system is adapted for consumer applications which require amplification of different types of audio signals (i.e.: stereo, television, radio, door bell, intercom, etc.) at central locations. Also, the system disclosed by Farinelli is modular and cascadable such that the user may purchase the system with a single amplifier and later purchase and add additional amplifier units to the system by inserting additional amplifier cards to the system chassis. While Farinelli and similar such systems allow multiple audio signals to be distributed to multiple locations, none are specifically adapted for use with structured wiring systems.

Structured wiring systems generally comprise one or more central wiring panels that are used as a means to centralize and organize the miles of cables and individual system components required to distribute multi-room television, remote-control signals, camera video, multi-media, phone service, security, multi-room audio, and computer network & Internet services, to each room in a home, apartment building, or office building.

Another system adapted for distributing audio signals to a plurality of remote speakers is disclosed by U.S. Patent Application No. 2003/0035556 by Curtis et al. Curtis' patent application discloses an audio distribution system that combines the distributive elements of audio, power, and control signals over a plurality of distribution nodes. Curtis' system, however, is not adapted for modular expandability or for use with structured wiring systems.

Another such distribution system is disclosed by U.S. Pat. No. 7,068,972 to Tarr. Tarr's patent discloses an audio program distribution arrangement for use with a home area network in order to broadcast audio programming over a wireless, audio system, within a home area network. While Tarr's system is suited to distribution of audio signals, it is not compatible with the requirements of common structured wiring systems.

Another such audio signal distribution system is disclosed by U.S. Patent Application No. 2003/0007309 by Miller et al. Miller's patent application discloses a modular distribution system having a central distribution panel for distributing a plurality of signals and a plurality of outputs located at remote locations. While Miller's system allows structural wiring components to be distributed over modular outputs throughout a home, the system fails to disclose an audio preamplifier or amplifier that is configured to allow signals to be controlled throughout the structured wiring system.

Another such system for distributing audio signals to multiple rooms is disclosed by U.S. Patent Application No. 2006/0126862 by Andrews et al. Andrews' patent application discloses a distributed audio system wherein the power and audio signals are distributed from a central audio unit to a plurality of loudspeaker units over Category-5 cabling. In this manner, Andrews discloses an audio distribution system that is compatible with the audio and data communications cabling that is commonly installed for local area networks. The patent application, however, fails to disclose a modular and expandable preamplifier and amplifier system that is configured for use with structured wiring systems.

Thus, there remains a long felt need in the art for an audio distribution that allows audio signals to be distributed to multiple sources and is configured for use with structural wiring systems.

SUMMARY OF THE INVENTION

Various embodiments of the invention are directed toward overcoming the above shortcomings by disclosing a modular and expandable audio system that is adapted for use with structured wiring systems.

Various embodiments of the invention feature a control module component that is configured to serve as an input and a preamplification module for the various audio inputs. The control module generally comprises a preamplification system that features a plurality of audio inputs for receiving audio signals from a plurality of sources. In various embodiments of the invention, the control module features eight inputs that are configured to receive audio signals from standard Category-5 cables, Category-5e, or Category-6 cables. Other types of cables are known within the art and remain within the contemplation of the invention. In various embodiments of the invention, the device further features inputs for audio system controls and the controls amplification systems. The control module operates, generally speaking, by distributing the various inputted audio signals to the control amplifiers and other components that are featured as part of the structured wiring audio system.

Various embodiments of the invention also feature one or more control amplifier components. The control amplifier components operate, generally speaking, as amplification and distribution centers for audio signals received from the control modules and to various loudspeakers throughout the home. In various embodiments of the invention, for example, the control amplifier units feature a standard IEEE-1284 input that is configured to receive the various audio and control signals from the control module. Each control module features an IEEE-1284 output, such that it may be modularly connected to other such control amplifiers. In this manner, the control amplifiers may be modularly connected to one another such that they each may distribute audio signals to a selected number of zones throughout a home or building.

In various embodiments of the invention, other types of connectors known within the art, such as DA, DB, DC, DD, and DE sized connectors, USB connectors, other IEEE standard connectors, and further such connectors known in the art may be used in lieu of IEEE-1284 connectors. Other types of connections are known within the art may be used within the context of the invention.

In various embodiments of the invention, each control amplifier is configured to supply audio output signals to four zones. The audio output signals are supplied on standard output connectors that are configured to be connected to the audio wiring featured in structured wiring systems. In various embodiments of the invention, the standard outputs may feature additional subwoofer outputs that are configured to supply non-amplified audio signals to subwoofer components. The subwoofer outputs, in various embodiments of the invention, are configured to mate with standard RJ-14 connectors.

Other connectors and jacks, such as RJ11, RJ45, RCA, Jack Plug, XLR, DIN/Mini-DIN, BNC, DB connectors, Speakon, TosLink, banana plugs, binding posts, and further such connector and jack types are known within the art are remain within the contemplation of the invention.

The control amplifier IEEE-1284 inputs and outputs are standardized and configured to allow the modular and selectable expansion of the system. That is, the inputted signals, received from the control module units, are passed through each control amplifier such that additional control amplifiers are connected to the first control module. In this manner, the control module may supply audio to more multiple zones, depending upon the number of control amplifiers connected to the system. In various embodiments of the invention, the control amplifiers feature four outputs each. Thus, a user may add control amplifier components in increments of four, depending upon the number of control amplifiers used. For example, the use of three control amplifiers allows a user to supply audio to up to twelve separate zones throughout a house, apartment building, or office building.

Additionally, the control amplifiers, in various embodiments of the invention, may feature input and output busses that allow the audio control signals for various audio components to be likewise distributed throughout the home or building. In this manner, control signals, such as control signals received from remote control units, may be distributed through the system components to control the various audio components.

The exterior housings of the various system components are configured to be expandable and compatible with structured wiring systems. The dimensions of the system components allow them to conveniently fit in or around structured wiring systems. Because of the space constraints within standard structural wiring panelboards, the dimensions of all of the system components must be limited and configured to fit within the confined spaces. Additionally, the components are adapted to be mounted to walls or other such mounting surfaces. The depth of all of the components is configured to be equal, such that the components may be modularly mounted to a wall, stand, or other such support.

It remains within the contemplation of the invention to be used with varying structured wiring components known within the art. The system is further configurable to be used with various audio and audio control signals and sources. Any reference to a specific type of connector, component, or system should not be interpreted as limiting the scope of the invention. In this manner, the system provides a flexible, modular, and expandable audio distribution system that is compatible with standard structured wiring systems.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "structured wiring system" refers to any of the various panelboard distribution systems for low-voltage electronic signals; "preamplifier" refers to any of the various switching and control devices used within audio systems; and "amplifier" refers to any of the various audio components used to increase the power of audio signals and supply said signals to loudspeakers and the like. Any reference or not reference to a specific type of jack or connector should not be interpreted as limiting the scope of the invention. The invention may be practiced with any of the various connector and jack types known and not currently known within the art. Some of the connectors, cables, and connection types contemplated for use with this invention include: RJ11, RJ-14, RJ45, RCA, Jack Plug, XLR, DIN/Mini-DIN, BNC, DB connectors, Speakon, TosLink, banana plugs, binding posts, Category-5, Category-5e, or Category-6, optical connectors, DA, DB, DC, DD, and DE sized connectors, USB connectors, and other IEEE standard connectors.

Figure 1:
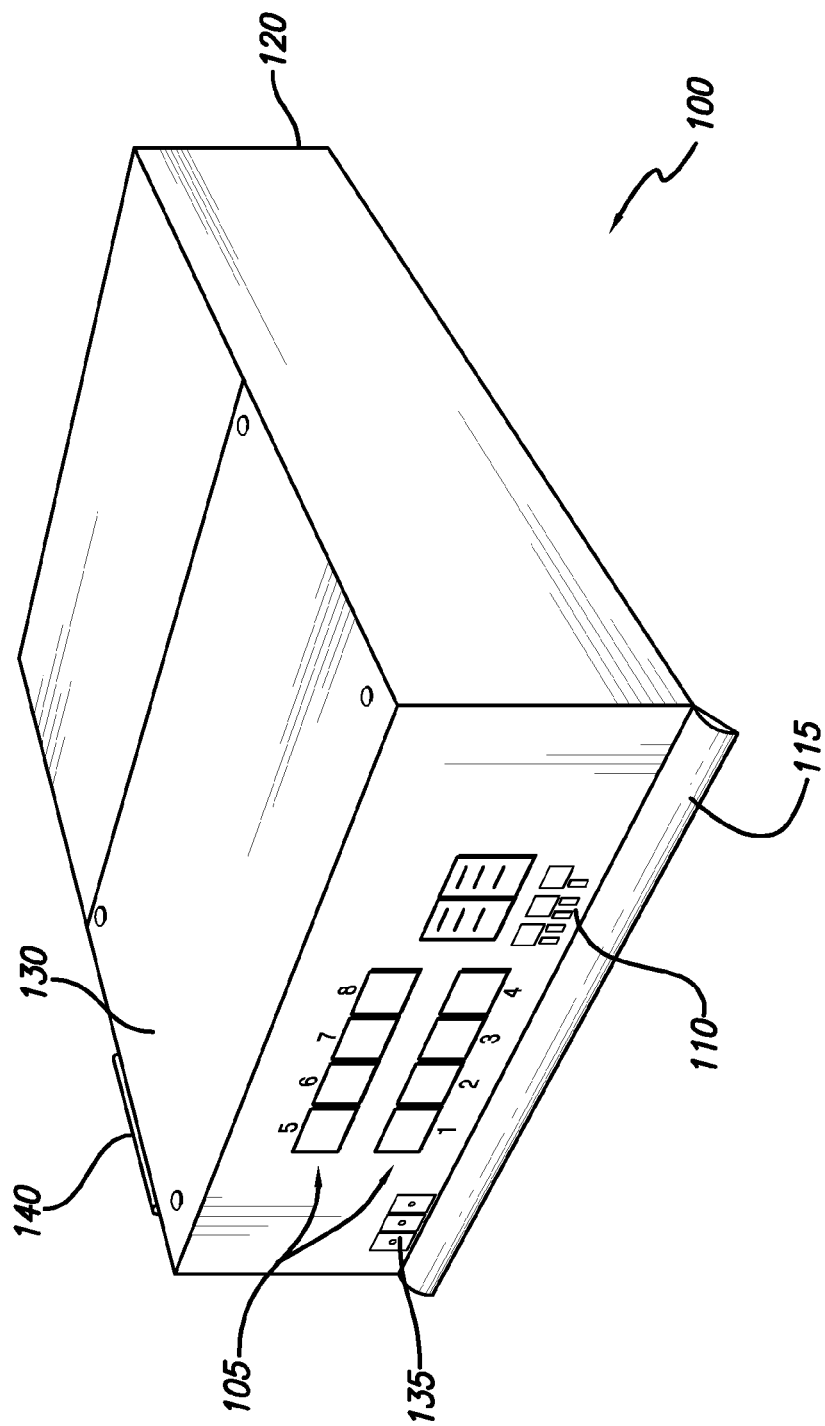
FIG. 1 is an illustration from a perspective view of the control module used in various embodiments of the invention.

FIG. 1 is an illustration from a perspective view of the control module used in various embodiments of the invention. A control module 100 is illustrated along with its components, including, the source audio inputs 105, the audio control inputs 110, the front mounting surface 115, the rear mounting surface 120, the removable cover 130, the AC-power inputs 135, and the IEEE-1284 output bus 140. The source audio inputs 105, in various embodiments of the invention comprise a plurality of Category-5 inputs for receiving audio signals along Category-5 cables from various audio sources. The audio control inputs 110, meanwhile, allow the control module 100 to receive and disseminate signals related to the control of audio equipment, amplifiers, and the like. The front mounting surface 115 and rear mounting surface 120 allow the control module 100 to be easily mounted to structured wiring panelboards and the like. The removable cover 130 allows the user to easily access the internal components of the control module by removing the screws and accessing the internal components of the control module 100. Finally, the IEEE-1284 output bus 140 serves to connect the control module 100 to a control amplifier or other such system component. Because the IEEE-1284 output bus 140 is configured to fit matingly with the corresponding IEEE-1284 of a control amplifier or other such system component, the connection may be made without the use of additional cabling. In this manner, the control module serves as a modular hub for receiving and distributing audio signals to a variety of components of the system.

Figure 2:
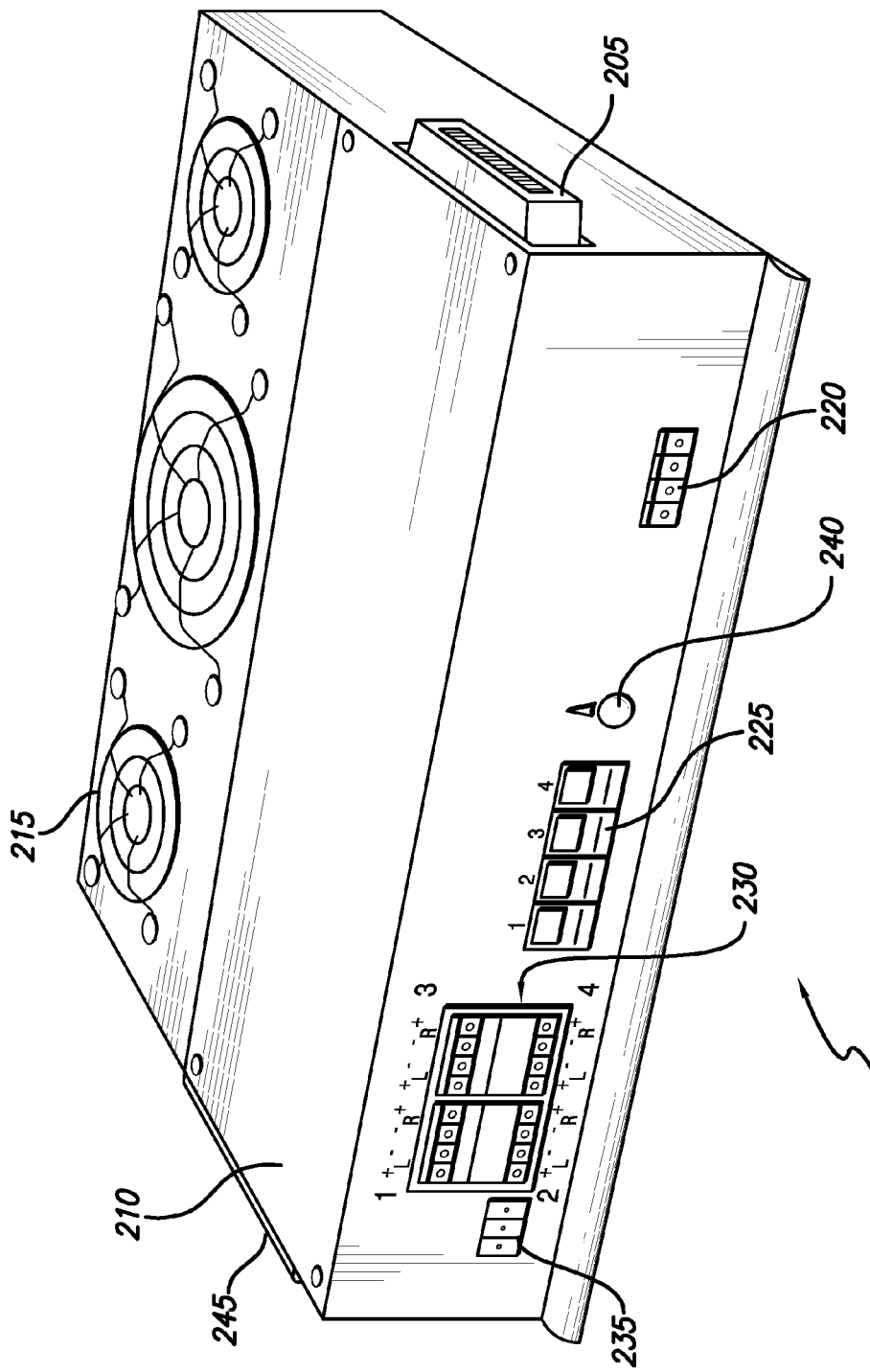
FIG. 2 is an illustration from a perspective view of the control amplifier used in various embodiments of the invention.

FIG. 2 is an illustration from a perspective view of the control amplifier used in various embodiments of the invention. A control amplifier 200 is illustrated along with its various components, including: the IEEE-1284 input bus 205, the removable top cover 210, the fan vents 215, the audio control inputs 220, the subwoofer outputs 225, the speaker outputs 230, the AC-power input 235, the address selector 240, and the IEEE-1284 output bus 245. The IEEE-1284 input bus 205 serves to allow the control amplifier 200 to be connected to a control module. The control amplifier 200 receives audio signals and various other signals and commands through the IEEE-1284 bus 205. Meanwhile, the control amplifier 200 features a pass-through feature, which is configured such that the signals received at the IEEE-1284 input bus 205 are also duplicated and forwarded through the IEEE-1284 output bus 245. In this manner, multiple module control amplifier 200 units may be connected to one another. In this manner, additional components, supplying audio signals to multiple zones within a home or building, may be added to a system. The removable top cover 210 allows users to access the internal components of the control amplifier 200. The audio control inputs 220 allow audio control signals to be received from the control module and other such components of the audio system. In various embodiments of the invention, the control amplifier 200 may also supply these signals to other control amplifiers 200 through the IEEE-1284 output bus 245. The subwoofer outputs 225 supply audio signals to subwoofer components of the audio system. In various embodiments of the invention, the control amplifier features an internal crossover system, in order to filter low-frequency signals and supply them to the subwoofer components. In various embodiments of the invention, the subwoofer outputs 225 are RJ-14 jacks, which are suitable for low-current signals that are supplied to internally amplified subwoofers. The speaker outputs 230 are configured to supply high-current, amplified audio signals to the loudspeakers in various zones of the home or building. In various embodiments of the invention, the control amplifier 200 is configured to supply audio to four zones in stereo, or eight loudspeakers. Typically, the number of zones and the number of subwoofer outputs 225 is the same, such that a subwoofer output is allowed for each audio zone. The address selector 240 allows the user to configure the control amplifier's 200 identification among a plurality of control amplifiers 200. In this manner, the control amplifier 200 performs multiple functions within the context of the audio system. First, it receives audio signals from the control module and distributes the audio signal to speakers and subwoofers in various zones throughout the home or building. Second, via the IEEE-1284 output bus 245, the control amplifier 200 allows the signals received from the control module to be forwarded to further control amplifiers 200 within the system.

Figure 3:
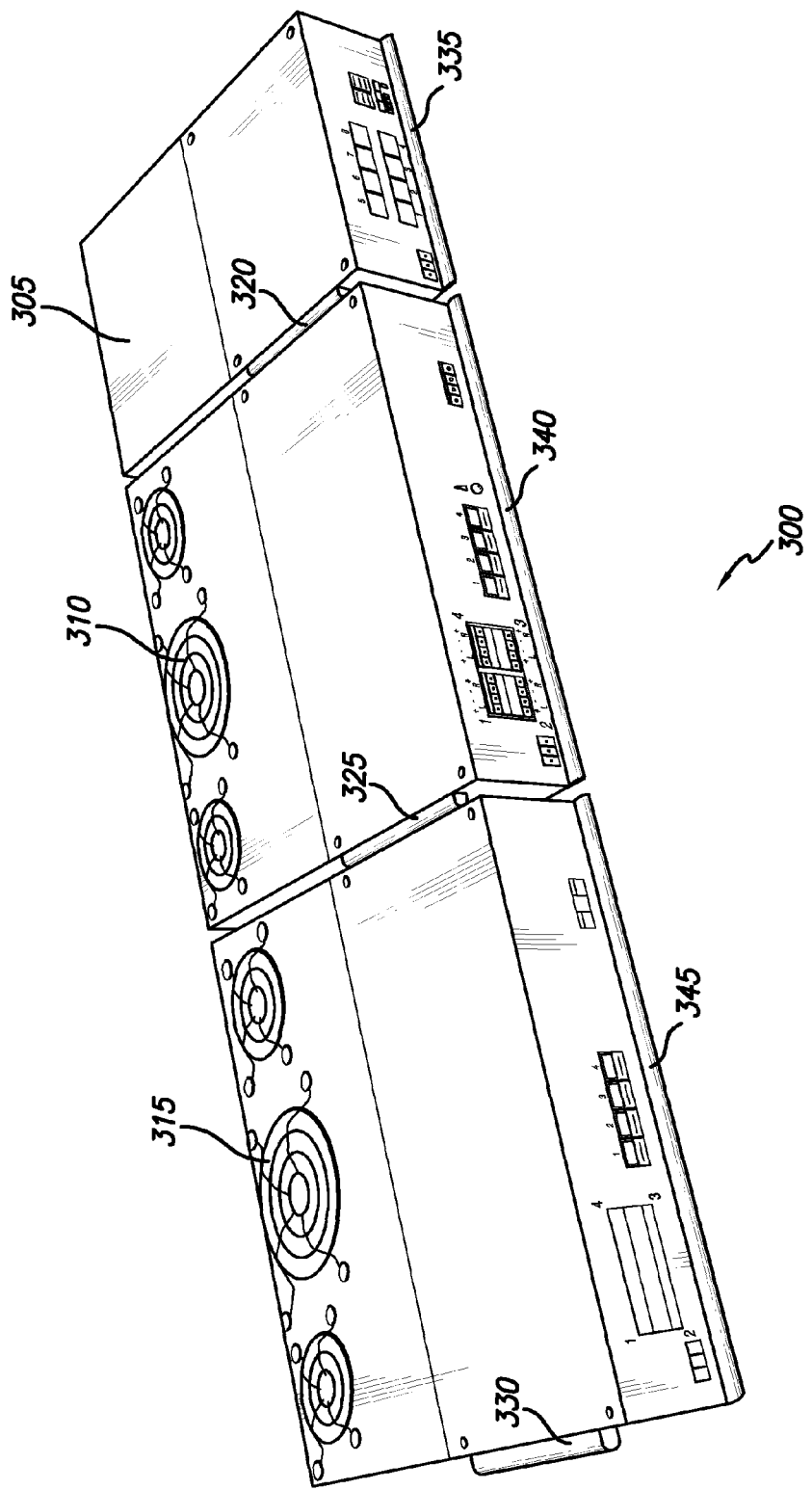
FIG. 3 is an illustration from a perspective view of the assembled components of a structured wiring audio system of various embodiments of the invention.

FIG. 3 is an illustration from a perspective view of the assembled components of a structured wiring audio system of various embodiments of the invention. The structured wiring audio system 300 features a control module 305, a first control amplifier 310, and a second control amplifier 315. The control module 305 connects to the first control amplifier 310 by joining the two at their respective IEEE-1284 busses 320 located at the side of the housing for the components. Similarly, the first control amplifier 310 is connected to the second control amplifier 315 by the IEEE-1284 busses 325 located at the side of the housing for the components. The second control amplifier 315 features an additional IEEE-1284 output bus 330 at the side of its housing, which may be use used to attach additional control amplifiers to the system. The components also feature mounting surfaces 335, 340, and 345, which allow the components to be mounted to a structured wiring panelboard, a wall surface, or any similar such surface. Thus, the system allows multiple audio components to be modularly connected to one another in order to form a multi-zone audio amplification, control, and distribution system. Furthermore, the system is configured to be compact and functional, within the parameters of common structural wiring systems.

What is claimed is:

1. A multi-component, modular, audio distribution, control, and amplification system for structured wiring systems, comprising:

a control module component, said control module component comprising:

a control module input bus, said control module input bus configured to receive a plurality of audio signals from a plurality of audio signal sources, an audio signal controller, said audio signal controller configured to allow a user to select one or more of said plurality of audio signals received at said control module input bus from said plurality of audio signal sources to create one or more selected audio signals, wherein said one or more selected audio signals are supplied to a control module output bus, said control module output bus configured to supply said one or more selected audio signals from said audio signal controller to other components of said multi-component, modular, audio distribution, control, and amplification system for structured wiring systems, and a housing for said control module component, said housing for said control module component configured to fit within a plurality of conventional structured wiring panelboards, a control amplifier component, said control amplifier component, comprising:

a control amplifier input bus, said control amplifier input bus configured to connect to and receive said one or more selected audio signals from said control module output bus, a control amplifier amplification circuit, said control amplifier amplification circuit configured to amplify said one or more selected audio signals to create one or more selected and amplified audio signals, a control amplifier speaker bus, said control amplifier speaker bus configured to selectively supply said one or more selected and amplified audio signals to a plurality of audio zones, a control amplifier output bus, said control amplifier output bus configured to supply said one or more selected audio signals received at said control amplifier input bus to one or more further control amplifier components, and a housing for said control amplifier component, said housing for said control amplifier component configured to fit within said plurality of conventional structured wiring panelboards.

2. A multi-component, modular, audio distribution, control, and amplification system for structured wiring systems according to claim 1, wherein said housing for said control module component and said housing for said control amplifier component feature mounting hardware that is configured to mount said housings to said plurality of conventional structured wiring panelboards.

3. A multi-component, modular, audio distribution, control, and amplification system for structured wiring systems according to claim 1, wherein said control module input bus features a plurality of inputs that are configured to receive said plurality of audio signals from said plurality of audio signal sources, said plurality of inputs being selected from one of the following input types consisting of: RJ11, RJ-14, RJ45, RCA, Jack Plug, XLR, DIN/Mini-DIN, BNC, DB connectors, Speakon, TosLink, banana plugs, binding posts, Category-5, Category-5e, and Category-6, optical connectors, DA, DB, DC, DD, and DE sized connectors, USB connectors, and other IEEE standard connectors.

4. A multi-component, modular, audio distribution, control, and amplification system for structured wiring systems according to claim 1, wherein said control module input bus features eight Category-5 inputs that are configured to receive said plurality of audio signals from said plurality of audio signal sources.

5. A multi-component, modular, audio distribution, control, and amplification system for structured wiring systems according to claim 1, wherein said control module output bus comprises an IEEE-1284 output bus.

6. A multi-component, modular, audio distribution, control, and amplification system for structured wiring systems according to claim 1, wherein said control amplifier input bus comprises an IEEE-1284 input bus.

7. A multi-component, modular, audio distribution, control, and amplification system for structured wiring systems according to claim 1, wherein said control amplifier output bus comprises an output bus selected from the following types of output busses consisting of: RJ11, RJ-14, RJ45, RCA, Jack Plug, XLR, DIN/Mini-DIN, BNC, DB connectors, Speakon, TosLink, banana plugs, binding posts, Category-5, Category-5e, and Category-6, optical connectors, DA, DB, DC, DD, and DE sized connectors, USB connectors, IEEE-1284, and other IEEE standard connectors.

8. A multi-component, modular, audio distribution, control, and amplification system for structured wiring systems according to claim 1, wherein said control module output bus comprises an output bus selected from the following types of output busses consisting of: RJ11, RJ-14, RJ45, RCA, Jack Plug, XLR, DIN/Mini-DIN, BNC, DB connectors, Speakon, TosLink, banana plugs, binding posts, Category-5, Category-5e, and Category-6, optical connectors, DA, DB, DC, DD, and DE sized connectors, USB connectors, IEEE-1284, and other IEEE standard connectors.

9. A multi-component, modular, audio distribution, control, and amplification system for structured wiring systems according to claim 1, wherein said control amplifier input bus comprises an input bus selected from the following types of input busses consisting of: RJ11, RJ-14, RJ45, RCA, Jack Plug, XLR, DIN/Mini-DIN, BNC, DB connectors, Speakon, TosLink, banana plugs, binding posts, Category-5, Category-5e, and Category-6, optical connectors, DA, DB, DC, DD, and DE sized connectors, USB connectors, IEEE-1284, and other IEEE standard connectors.

10. A multi-component, modular, audio distribution, control, and amplification system for structured wiring systems according to claim 1, wherein said control amplifier output bus comprises an output bus selected from the following types of output busses consisting of: RJ11, RJ-14, RJ45, RCA, Jack Plug, XLR, DIN/Mini-DIN, BNC, DB connectors, Speakon, TosLink, banana plugs, binding posts, Category-5, Category-5e, and Category-6, optical connectors, DA, DB, DC, DD, and DE sized connectors, USB connectors, IEEE-1284, and other IEEE standard connectors.

11. A multi-component, modular, audio distribution, control, and amplification system for structured wiring systems according to claim 1, wherein said control amplifier speaker bus selectively supplies said one or more selected and amplified audio signals to four zones.

12. A multi-component, modular, audio distribution, control, and amplification system for structured wiring systems according to claim 1, wherein said control amplifier component further features a crossover-network such that low-frequency audio signals are isolated and supplied to discrete subwoofer outputs at said control amplifier speaker bus, the number of said subwoofer outputs being equal to the number of zones supplied by said control amplifier speaker bus.

13. A multi-component, modular, audio distribution, control, and amplification system for structured wiring systems according to claim 12, wherein said subwoofer outputs comprise RJ-14 outputs.

14. A multi-component, modular, audio distribution, control, and amplification system for structured wiring systems according to claim 1, wherein said multi-component, modular, audio distribution, control, and amplification system for structured wiring systems further features an audio component control system, said audio component control system being configured to distribute audio component control signals among the various components of the multi-component, modular, audio distribution, control, and amplification system.

15. A multi-component, modular, audio distribution, control, and amplification system for structured wiring systems, comprising:
  a control module component, said control module component comprising:
    a control module input bus, said control module input bus configured to receive a plurality of audio signals from eight audio signal sources and comprising eight Category-5 cable receptacles,
    an audio signal controller, said audio signal controller configured to allow a user to select one or more of said plurality of audio signals received at said control module input bus from said plurality of audio signal sources to create one or more selected audio signals and supply said one or more selected audio signals to a control module output bus,
    said control module output bus comprising an IEEE-1284 output bus configured to supply said one or more selected audio signals from said audio signal controller to other components of said multi-component, modular, audio distribution, control, and amplification system, and
    a housing for said control module component, said housing for said control module component configured to fit within a plurality of conventional structured wiring panelboards,
  a control amplifier component, said control amplifier component, comprising:
    a control amplifier input bus, said control amplifier input bus comprising an IEEE-1284 input bus configured to connect to and receive said one or more selected audio signals from said control module output bus,
    a control amplifier amplification circuit, said control amplifier amplification circuit configured to amplify said one or more selected audio signals to create one or more selected and amplified audio signals, a control amplifier speaker bus, said control amplifier speaker bus configured to selectively supply said one or more selected and amplified audio signals to four audio zones, a control amplifier output bus, said control amplifier output bus configured to supply said one or more selected audio signals received at said control amplifier input bus to one or more further control amplifier components, and a housing for said control amplifier component, said housing for said control amplifier component configured to fit within said plurality of conventional structured wiring panelboards.

16. A multi-component, modular, audio distribution, control, and amplification system for structured wiring systems according to claim 15, wherein said housing for said control module component and said housing for said control amplifier component feature mounting hardware that is configured to mount said housings to said plurality of conventional structured wiring panelboards.

17. A multi-component, modular, audio distribution, control, and amplification system for structured wiring systems according to claim 15, wherein said control amplifier component further features a crossover-network such that low-frequency audio signals are isolated and supplied to discrete subwoofer outputs at said control amplifier speaker bus, the number of said subwoofer outputs being equal to the number of zones supplied by said control amplifier speaker bus.

18. A multi-component, modular, audio distribution, control, and amplification system for structured wiring systems according to claim 17, wherein said subwoofer outputs comprise RJ-14 outputs.

19. A multi-component, modular, audio distribution, control, and amplification system for structured wiring systems according to claim 15, wherein said multi-component, modular, audio distribution, control, and amplification system for structured wiring systems further features an audio component control system, said audio component control system being configured to distribute audio component control signals among the various components of the multi-component, modular, audio distribution, control, and amplification system.

* * * * *